United States Patent
Qian et al.

(10) Patent No.: US 9,964,318 B2
(45) Date of Patent: May 8, 2018

(54) WATER TOWER APPLIED TO THE WATER SOURCE HEAT PUMP CENTRAL AIR CONDITIONER

(71) Applicant: GUANGDONG JINBEI ENERGY-EFFICIENT TECHNOLOGY CO. LTD, Zhaoqing (CN)

(72) Inventors: Tu Qian, Zhaoqing (CN); Xiaopeng Qian, Zhaoqing (CN)

(73) Assignee: GUANGDONG JINBEI ENERGY-EFFICIENT TECHNOLOGY CO. LTD (CN)

( * ) Notice: Subject to any disclaimer, the term of this patent is extended or adjusted under 35 U.S.C. 154(b) by 35 days.

(21) Appl. No.: 15/125,327

(22) PCT Filed: Nov. 25, 2014

(86) PCT No.: PCT/CN2014/092174
§ 371 (c)(1),
(2) Date: Sep. 12, 2016

(87) PCT Pub. No.: WO2015/135339
PCT Pub. Date: Sep. 17, 2015

(65) Prior Publication Data
US 2017/0074527 A1    Mar. 16, 2017

(30) Foreign Application Priority Data
Mar. 10, 2014  (CN) .......................... 2014 1 0085833

(51) Int. Cl.
*F24F 3/06*    (2006.01)
*F24F 3/00*    (2006.01)
(Continued)

(52) U.S. Cl.
CPC ................. *F24F 3/001* (2013.01); *F24F 3/06* (2013.01); *F25B 13/00* (2013.01); *F28C 1/00* (2013.01);
(Continued)

(58) Field of Classification Search
CPC ... F24F 3/001; F24F 3/06; F25B 13/00; F28C 1/00; F28F 25/00; F28F 27/02; F28F 27/003
(Continued)

(56) References Cited

U.S. PATENT DOCUMENTS 3,165,148 A * 1/1965 Soule ...................... F24F 3/001
165/211
3,593,780 A * 7/1971 Donnelly .................. F24F 3/06
165/218
(Continued)

FOREIGN PATENT DOCUMENTS

CN        2531342 Y     1/2003
CN      101074794 A    11/2007
(Continued)

OTHER PUBLICATIONS

International Search Report PCT/CN2014/092174; International Filing Date: Nov. 25, 2014; 2 Pgs, Feb. 2015.
(Continued)

*Primary Examiner* — Charles Bushey
(74) *Attorney, Agent, or Firm* — Schmeiser, Olsen & Watts, LLP

(57) ABSTRACT

A water tower applied to the water source heat pump central air conditioner is provided, and includes a tower body, a water storage tank, an air distributing device, cooling fillers, a water distributing device, a water collector, and ventilating equipment, wherein the water storage tank is arranged at the bottom of the interior of the tower body, and the air
(Continued)

distributing device, the cooling fillers, the water distributing device, the water collector and the ventilating equipment are sequentially arranged above the water storage tank. Furthermore, the water tower applied to the water source heat pump central air conditioner includes a plurality of return water pipes and a plurality of supply pipes; the water inlet ends of the multiple return water pipes are in connection with the return water outlets of a plurality of air conditioner main units, arranged in all stories correspondingly.

12 Claims, 1 Drawing Sheet

(51) Int. Cl.
    *F28F 25/00*       (2006.01)
    *F28C 1/00*        (2006.01)
    *F28F 27/00*       (2006.01)
    *F28F 27/02*       (2006.01)
    *F25B 13/00*       (2006.01)

(52) U.S. Cl.
    CPC ............ *F28F 25/00* (2013.01); *F28F 27/003* (2013.01); *F28F 27/02* (2013.01)

(58) Field of Classification Search
    USPC .................... 261/23.1, 26, 39.1, 42, DIG. 11
    See application file for complete search history.

(56) References Cited

U.S. PATENT DOCUMENTS

| | | | | |
|---|---|---|---|---|
| 4,815,527 A | * | 3/1989 | Meckler | F24F 3/001 165/50 |
| 4,949,547 A | * | 8/1990 | Shimizu | F24F 5/0003 62/238.7 |
| 2016/0003489 A1 | * | 1/2016 | Casper | F24F 3/001 165/104.31 |
| 2016/0003561 A1 | * | 1/2016 | Casper | F24F 3/001 165/201 |
| 2016/0033158 A1 | * | 2/2016 | Lu | F25B 23/006 165/218 |

FOREIGN PATENT DOCUMENTS

| | | |
|---|---|---|
| CN | 102644984 A | 8/2012 |
| CN | 203744426 U | 7/2014 |
| CN | 203744447 U | 7/2014 |
| JP | H10141872 A | 5/1998 |

OTHER PUBLICATIONS

Written Opinion PCT/CN2014/092174; International Filing Date: Nov. 25, 2014 6 Pgs, Feb. 2015.

* cited by examiner

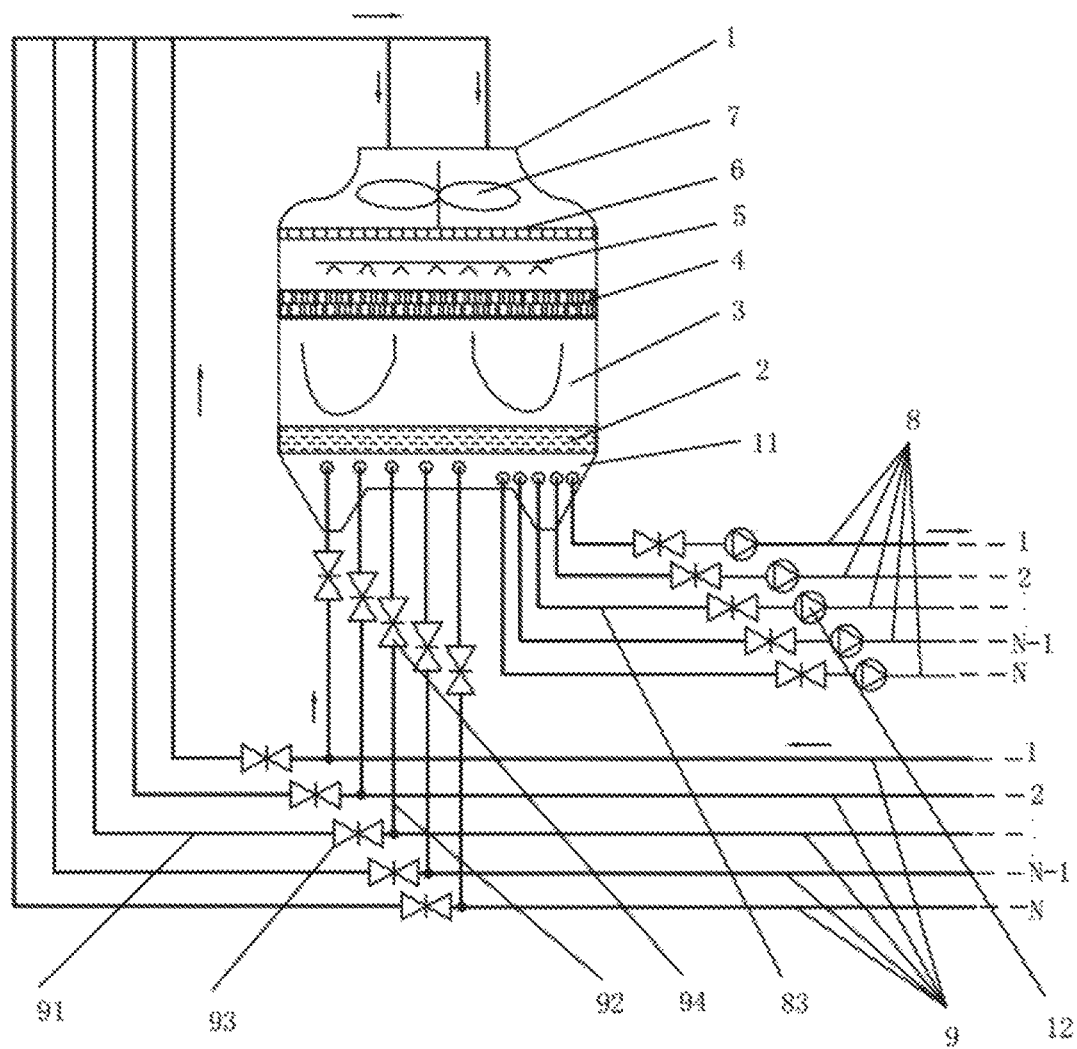

WATER TOWER APPLIED TO THE WATER SOURCE HEAT PUMP CENTRAL AIR CONDITIONER

CROSS-REFERENCE TO RELATED APPLICATIONS

This application claims priority to PCT Application No. PCT/CN2014/092174, having a filing date of Nov. 25, 2014, based off of Chinese application No. 201410085833.2 having a filing date of Mar. 10, 2014, the entire contents of which are hereby incorporated by reference.

FIELD OF TECHNOLOGY

The following relates to the field of air conditioner, in particular to a water tower applied to the water source heat pump central air conditioner.

BACKGROUND

A water source heat pump central air conditioner is a low-carbon and energy-saving air conditioner that has been developed in recent years, with the most important character being that the powerful air-exhausting and heat-dissipating refrigeration of an externally-suspended air conditioner is transformed into a built-in central water cooling system.

An existing water tower of a water source heat pump central air conditioner generally comprises a tower body, a water storage tank, an air distributing device, cooling fillers, a water distributing device, a water collector, ventilating equipment, a return water main, a supply main, and a main control water pump. A cooling water pond is arranged at the bottom of the interior of the tower body; the air distributing device is arranged above the cooling water pond; the cooling fillers are arranged above the air distributing device; the water distributing device is arranged above the cooling fillers; the water collector is arranged above the cooling fillers; and the ventilating equipment is arranged above the water collector. The main control water pump is arranged inside the return water main and communicates with it. The water outlet end and the water inlet end of the return water main are connected with the top of the tower body and a return water outlet of the main unit of the water source heat pump central air conditioner; and the water tower is connected with the supply main through an outlet of the water storage tank. It can be known from the structure of the existing water tower, that the design philosophy of the existing water tower applied to the water source heat pump central air conditioner is central intensive processing; that is, when a central water-cooling processing water pump is designed, only the water supply and the pressure supply of a whole building are considered; and in other words, the main control water pump of the existing water tower always works normally at any time no matter what the operating mode of the existing water source central air conditioner is and no matter whether people occupy all storeys of the building or not. The power of the existing water tower is huge, and energy consumption is extremely high. Due to the fact that only the main control design of the return water main and the supply main is adopted for the structure of the existing water tower, the existing water tower is not suitable for controlling the multi-storey building storey by storey. For example, in a public building such as an office building or a hotel, if workers of a certain department work overtime in a certain storey or if customers are only in some storey of a hotel, the existing water tower still has to operate around the clock, and consequentially severe waste can be caused.

SUMMARY

An aspect relates to an energy-saving and space-saving water tower applied to a water source heat pump central air conditioner, by which an air-conditioning system of a multi-storey building can be controlled storey by storey, and the energy consumption of the main control water pump can be reduced.

The water tower applied to the water source heat pump central air conditioner of embodiments of the present invention comprises a tower body, a water storage tank, an air distributing device, cooling fillers, a water distributing device, a water collector, and ventilating equipment, wherein the water storage tank is arranged at the bottom of the interior of the tower body; and the air distributing device, the cooling fillers, the water distributing device, the water collector and the ventilating equipment are sequentially arranged above the water storage tank; furthermore, the water tower applied to the water source heat pump central air conditioner comprises a plurality of return water pipes and a plurality of supply pipes; the water inlet ends of the multiple return water pipes are connected correspondingly with the return water outlets of a plurality of air conditioner main units that are arranged in all storeys, of the water source heat pump central air conditioner; and the water outlet ends of the multiple return water pipes are connected correspondingly with the top of the tower body through gate valves and with the water distributing device; water inlets of the multiple supply pipes are in connection with the water storage tank; and water outlets of the multiple supply pipes are in connection with water source inlets of the multiple air conditioner main units through small water pumps correspondingly. By the adoption of the above scheme, the water tower applied to the water source heat pump central air conditioner of embodiments of the present invention can control the air-conditioning system of the multi-storey building storey by storey, reduce the energy consumption of the main control water pump, and save the energy and space of the building.

Furthermore, the water tower applied to the water source heat pump central air conditioner comprises water temperature induction controllers which are electrically connected with the small water pumps; the water temperature induction controllers detect the temperature of the return water outlets of the multiple air conditioner main units, obtain a temperature signal through processing, and control the small water pumps corresponding to the multiple air conditioner main units correspondingly to operate according to the temperature signal. By the adoption of the water temperature induction controller, intelligent control over the small water pumps in all storeys can be achieved easily, and a response can be given in time according to the whether people are in all storeys or whether an operating is needed or not.

Furthermore, the water tower applied to the water source heat pump central air conditioner comprises a plurality of power pipeline pumps with different powers; the multiple power pipeline pumps are arranged between outlets of the multiple small water pumps and the water source inlets of the multiple air conditioner main units correspondingly; and inlets and outlets of the multiple power pipeline pumps communicate with the outlets of the multiple small water pumps and the water source inlets of the multiple air conditioner main units correspondingly. The power pipeline pumps with the different powers are arranged between the supply pipes and the air conditioner main units in all storeys according to the cold energy or heat energy consumed by all storeys of the air conditioner. The existing main control water pump with the huge power is divided into multiple small water pumps through the multiple power pipeline pumps, and thus energy consumption of the water pump can be minimized.

Furthermore, a plurality of water outlets with different diameters which are in one-to-one correspondence with the multiple supply pipes are formed at the bottom of the water storage tank; the multiple water outlets are in a butt joint with the multiple supply pipes through pipe-diameter valves that are matched with the water outlets correspondingly. The diameters of the multiple water outlets are set according to the cold energy consumed by the air conditioner in all storeys, so as to be applied to different storeys, thus saving energy and improving the working efficiency of the air conditioner main units throughout all storeys.

Furthermore, two pipelines are arranged at the water outlet end of each of the multiple return water pipes, wherein one pipeline is connected with the top of the tower body through a gate valve and with the water distributing device, and the other pipeline is connected with the bottom of the tower body through a gate valve with the water storage tank. This arrangement helps to reduce the influence of the external environment on the return water temperature in winter, guarantee the normal heating of the water source heat pump air conditioner, reduce the burden of a compressor of the water source heat pump air conditioner and the energy consumption, and further prolong the service life of the water source heat energy air conditioner.

Furthermore, the water tower applied to the water source heat pump central air conditioner comprises a heat pump heater which is used for heating water in the water storage tank; the heat pump heater is arranged at the bottom of the tower body, and a cold water inlet and a hot water outlet of the heat pump heater are in connection with the water storage tank through two valves correspondingly. The heat pump heater can accurately control the water temperature, so as to guarantee the better operation of the equipment and the heating in rooms, reduce the burden of the compressor of the water source heat pump air conditioner and the energy consumption, and prolong the service life of the water source heat pump air conditioner.

Furthermore, the gate valves are two-way valves that are installed in each of the multiple return water pipes; one of the two pipelines in each return water pipe stretches into the tower body from the top of the tower body through one two-way valve in the return water pipe and is in connection with the water distributing device; and the other pipeline is in connection with the water storage tank through the other two-way valve in the return water pipe.

Furthermore, the gate valves are three-way valves, and one three-way valve is installed in each of the multiple return water pipes; each return water pipe is in connection with an inlet of the three-way valve; one of the two pipelines of the return water pipe is in connection with one outlet of the three-way valve, and the other pipeline of the return water pipe is in connection with the other outlet of the three-way valve.

Furthermore, spraying openings communicating with the interior of the water distributing device are formed at the bottom of the water distributing device; the spraying openings are aligned to the cooling fillers. Through the arrangement, air conditioner return water can be made to drop onto the cooling fillers more evenly and more sufficiently and can be better treated by the cooling fillers.

Furthermore, the water tower applied to the water source heat pump central air conditioner comprises a plurality of electromagnetic valves which are used for controlling the water quantity; the multiple electromagnetic valves are in connection with the multiple supply pipes correspondingly.

For better understanding and implementing, a detailed description of the present invention is given with accompanying drawings.

BRIEF DESCRIPTION

Some of the embodiments will be described in detail, with reference to the following figures, wherein like designations denote like members, wherein:

FIG. 1 is a structural schematic diagram of a water tower applied to the water source heat pump central air conditioner of embodiments of the present invention.

DETAILED DESCRIPTION

Embodiment 1

FIG. 1 is the structural schematic diagram of the water tower applied to the water source heat pump central air conditioner of embodiments of the present invention. The water tower applied to the water source heat pump central air conditioner of embodiments of the present invention comprises a tower body 1, a water storage tank 2, an air distributing device 3, cooling fillers 4, a water distributing device 5, a water collector 6, ventilating equipment 7, a plurality of return water pipes 9 and a plurality of supply pipes 8. The water storage tank 2 is arranged at the bottom of the interior of the tower body 1, and the air distributing device 3, the cooling fillers 4, the water distributing device 5, the water collector 6 and the ventilating equipment 7 are arranged above the water storage tank 2 in sequence. The water inlet ends of the multiple return water pipes 9 are in connection with return water outlets of a plurality of air conditioner main units, arranged in all storeys correspondingly, in the water source heat pump central air conditioner correspondingly, and the water outlet ends of the multiple return water pipes 9 are connected with the top of the tower body 1 through gate valves correspondingly and are in connection with the water distributing device 5. Water inlets of the multiple supply pipes 8 are in connection with the water storage tank 2, and water outlets of the multiple supply pipes 8 are in connection with water source inlets of the multiple air conditioner main units through small water pumps correspondingly. By dividing the return water main of the existing water tower applied to the water source heat pump central air conditioner into the multiple return water pipes 9 in embodiments of the present invention, diving the supply main of the existing water tower into the multiple supply mains in embodiments of the present invention and diving the main control water pump of the existing water tower into the small water pumps arranged in the supply mains, the effect where the water tower applied to the water source heat pump central air conditioner of embodiments of the present invention can control the air-conditioning system of a multi-storey building storey by storey is achieved, energy consumption of the main control water pump is reduced, energy is saved, and the space of the building is saved.

Furthermore, the water tower applied to the water source heat pump central air conditioner comprises water temperature induction controllers which are electrically connected with the small water pumps; the water temperature induction controllers detect the temperatures of the return water outlets of the multiple air conditioner main units, obtain a temperature signal through processing, and control the small water pumps corresponding to the multiple air conditioner main units correspondingly to operate according to the temperature signal.

Furthermore, the water tower applied to the water source heat pump central air conditioner comprises a heat pump heater 11 used for heating water in the water storage tank 2; the heat pump heater 11 is arranged at the bottom of the tower body 1, and a cold water inlet and a hot water outlet of the heat pump heater 11 are in connection with the water storage tank 2 through two valves correspondingly.

Furthermore, the water tower applied to the water source heat pump central air conditioner comprises a plurality of power pipeline pumps with different powers. The multiple power pipeline pumps are arranged between the outlets of the multiple small water pumps and the water source inlets of the multiple air conditioner main units correspondingly, and inlets and outlets of the multiple power pipeline pumps communicate with the outlets of the multiple small water pumps and the water source inlets of the multiple air conditioner main units correspondingly. The power pipeline pumps with the different powers are arranged between the supply pipes and the air conditioner main units in all storeys according to the cold energy or heat energy, consumed by all storeys, of the air conditioners, for example, the power pipeline pumps with the power range being 0.75 KW-1.1 KW or 0.75 KW-1.5 KW or 0.75 KW-2.0 KW or 0.75 KW-2.5 KW or 0.75 KW-4.5 KW or 0.75 KW-7.5 KW and the like are arranged, the existing main control water pump with the huge power is divided into the multiple small water pumps through the power pipeline pumps, and thus energy consumption of the water pump is minimized.

Furthermore, a plurality of water outlets which are in one-to-one correspondence with the multiple supply pipes 8 are formed at the bottom of the water storage tank 2. The multiple water outlets are in a butt joint with the multiple supply pipes 8 through pipe-diameter valves which are matched with the multiple water outlets correspondingly. The diameters of the multiple water outlets are different, for example, the diameters of the multiple water outlets are set to be 50 mm, 75 mm, 90 mm, 100 mm, 160 mm and other dimensions according to the cold energy or heat energy, consumed by all storeys, of the air conditioner, and the diameters of the pipe-diameter valves matched with the water outlets in diameter dimension are 50 mm, 75 mm, 90 mm, 100 mm and 160 mm in sequence.

Furthermore, each of the multiple supply pipes 8 is in connection with the water storage tank 2 through a butterfly valve.

Two pipelines are arranged at the water outlet end of each of the multiple return water pipes 9, wherein one pipeline is connected with the top of the tower body 1 through a gate valve and is in connection with the water distributing device 5, and the other pipeline is connected with the bottom of the tower body 1 and is in connection with the water storage tank 2.

In the embodiment, the gate valves are two-way valves, and two two-way valves are installed in each of the multiple return water pipes 9. One of the two pipelines in each of the multiple return water pipes 9 stretches into the tower body 1 from the top of the tower body 1 through one two-way valve and is in connection with the water distributing device 5, and the other pipeline is in connection with the water storage tank 2 through the other two-way valve.

Spraying openings communicating with the interior of the water distributing device 5 are formed at the bottom of the water distributing device 5; the spraying openings are aligned to the cooling fillers 4.

The structure of the air distributing device 3 is consistent with that of an air distributing device of the existing water tower (also called cooling tower) applied to the water source heat pump central air conditioner; the compositions and structure of the cooling fillers 4 are consistent with those of cooling fillers of the existing water tower applied to the water source heat pump central air conditioner; the structure of the air distributing device 5 is consistent with that of a water distributing device of the existing water tower applied to the water source heat pump central air conditioner; the structure of the water collector 6 is consistent with that of a water collector of the existing water tower applied to the water source heat pump central air conditioner; the structure of the ventilating equipment 7 is consistent with that of ventilating equipment of the existing water tower applied to the water source heat pump central air conditioner; the structure of the heat pump heater 11 is consistent with that of an existing heat pump heater.

The operating process of the water tower applied to the water source heat pump central air conditioner of embodiments of the present invention is as follows:

Firstly, the water temperature induction controllers detect the temperatures of the return water outlets of the multiple air conditioner main units and obtain a temperature signal through processing. When the corresponding water temperature induction controller detects that the temperature signal value in a certain storey is within the set threshold value range, it indicates that no one is in the storey or that heat-exchange refrigeration is not needed, and then the water temperature induction controller controls the small water pump in the storey to stop; otherwise, the water temperature induction controller controls the small water pump in the storey to operate. When the small water pump operates, the water source heat pump central air conditioner is generally used for heat-exchange refrigeration in summer, and the water tower applied to the water source heat pump central air conditioner needs to operate to cool the air conditioner return water at the moment. At the moment, the two-way valve 93 between the pipeline 91, corresponding to the storey, of one of the multiple return water pipes 9 and the top of the tower body 1 is opened, and the two-way valve 94 between the other pipeline 92 corresponding to the storey and the water storage tank 2 is kept closed. In this way, hot water generated through refrigeration of the compressor of the water source heat pump central air conditioner applies pressure to the top of the tower body 1 of the water tower through the water pumps in the water source heat pump central air conditioner; that is, the air conditioner return water reaches the top of the tower body 1 along branched pipelines under the action of the pressure and then enters the water distributing device 5 from the top of the tower body 1; the ventilating equipment 7 at the top of the tower body 1 and the air distributing device 3 above the water storage tank 2 act jointly at the same time and provide high air velocity and stable air flow for cooling, and the water collector 6 below the ventilating equipment 7 can decrease the water content of air flowing out of the water tower, so that the amount of cooling water contained in the air is reduced, and accordingly the loss of the cooling water is reduced; then the air conditioner return water is evenly distributed on the whole cooling fillers 4 through the water distributing device 5. The cooling fillers 4 make the hot air conditioner return water entering the water tower form tiny water drops or a thin water film, so as to increase the contact area of water and air, prolong the contact time of water and air, facilitate the heat exchange between water and air, and accordingly cool the air conditioner return water and make it fall into the water storage. The obtained cooled air conditioner return water can enter the supply pipe 83 corresponding to the storey through the water outlet, corresponding to the storey, in the water storage tank 2, and the treated air conditioner return water is delivered into the corresponding water source inlet of the water source heat pump central air conditioner by means of the supply pipe 83 through the small water pump 12 installed in the supply pipe 83. In winter, the water source heat pump central air conditioner is generally used for heat-exchange heating, and the water tower needs to operate to heat the air conditioner return water. The two-way valve 94 between the other pipeline 92, corresponding to the storey, of one of the multiple return water pipes 9 and the water storage tank 2 is opened, and the two-way valve 93 between the other pipeline 91 corresponding to the storey and the top of the tower body 1 is kept closed. In this way, the air conditioner return water directly enters the water storage tank 2 from the bottom of the tower body 1 along the pipeline 92, and the temperature of the air conditioner return water is controlled by the heat pump heater 11 at the same time. If the temperature of the air conditioner return water is as low as 16 DEG C., the heat pump heater 11 heats the air conditioner return water entering the water storage tank 22 till the temperature of the air conditioner return water is not lower than 16 DEG C.; otherwise, the heat pump heater 11 does not heat the air conditioner return water entering the water storage tank 2. Then the heated air conditioner return water can enter the corresponding supply pipe 83 through the corresponding water outlet of the water storage tank 2, and the treated air conditioner return water is delivered into the corresponding water source inlet of the water source heat pump central air conditioner by means of the supply pipe 83 through the small water pump 12 installed in the supply pipe 83. When heat-exchange refrigeration or heat-exchange heating needs to be conducted on a certain storey, the above process is circulated, and the water tower does not stop operating until no person exists in the storey or heat-exchange heating or heat-exchange refrigeration is not needed.

Embodiment 2

The structure of a water tower in the embodiment is similar to that of the water tower in embodiment I, with the difference being that the two two-way valves in each of the multiple return water pipes in embodiment I are replaced by a three-way valve; that is, the water tower in the embodiment is provided with multiple three-way valves which are installed in the multiple return water pipes 9 correspondingly. Each of the multiple return water pipes 9 is in connection with an inlet of the three-way valve in the return water pipe 9. One of the two pipelines of the return water pipe 9 is in connection with one outlet of the three-way valve, and the other pipeline is in connection with the other outlet of the three-way valve.

Embodiment 3

The structure of a water tower of the embodiment is similar to that of the water tower in embodiment I, with the difference being that a plurality of electromagnetic valves used for controlling the water quantity are additionally arranged. The multiple electromagnetic valves are in connection with the multiple supply pipes 8 correspondingly.

Compared with the prior art, the water tower applied to the water source heat pump central air conditioner of embodiments of the present invention can control the air-conditioning system of the multi-storey building storey by storey; reduce the energy consumption of the main control water pump and save the energy the space of the building.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

What is claimed is:

1. A water tower applied to a water source heat pump central air conditioner, comprising:
   a tower body;
   a water storage tank;
   an air distributing device;
   a plurality of cooling fillers;
   a water distributing device;
   a water collector; and
   a ventilating equipment;
   wherein the water storage tank is arranged at a bottom of an interior of the tower body, and the air distributing device, the plurality of cooling fillers, the water distributing device, the water collector, and the ventilating equipment are sequentially arranged above the water storage tank;
   wherein the water tower applied to the water source heat pump central air conditioner further comprises a plurality of return water pipes and a plurality of supply pipes, water inlet ends of the plurality of return water pipes are connected correspondently with return water outlets of a plurality of main units that are arranged in all stories, of the water source heat pump central air conditioner, and the water outlet ends of the plurality of return water pipes are connected with a top of the tower body through gate valves correspondingly and are in connection with the water distributing device;
   wherein water inlets of the plurality of supply pipes are in connection with the water storage tank, and water outlets of the plurality of supply pipes are in connection with water source inlets of the multiple air conditioner main units through small water pumps correspondingly.

2. The water tower applied to the water source heat pump central air conditioner according to claim 1, further comprising water temperature induction controllers which are electrically connected with the small water pumps; the water temperature induction controllers detect the temperature of the return water outlets of the multiple air conditioner main units, obtain a temperature signal through processing, and control the small water pumps corresponding to the multiple air conditioner main units correspondingly to operate according to the temperature signal.

3. The water tower applied to the water source heat pump central air conditioner according to claim 2, wherein, the water tower applied to the water source heat pump central air conditioner further comprises a plurality of power pipeline pumps with different powers; the multiple power pipeline pumps are arranged between outlets of the multiple small water pumps and the water source inlets of the multiple air conditioner main units correspondingly, and inlets and outlets of the multiple power pipeline pumps communicate with the outlets of the multiple small water pumps and the water source inlets of the multiple air conditioner main units correspondingly.

4. The water tower applied to the water source heat pump central air conditioner according to claim 3, wherein, a plurality of water outlets with different diameters which are in one-to-one correspondence with the multiple supply pipes are formed at the bottom of the water storage tank; the multiple water outlets are in a butt joint with the multiple supply pipes through pipe-diameter valves that are matched with the water outlets correspondingly.

5. The water tower applied to the water source heat pump central air conditioner according to claim 4, wherein, two pipelines are arranged at the water outlet end of each of the multiple return water pipes, wherein one pipeline is connected with the top of the tower body through a gate valve and is in connection with the water distributing device, and the other pipeline is connected with the bottom of the tower body through a gate valve and is in connection with the water storage tank.

6. The water tower applied to the water source heat pump central air conditioner according to claim 5, wherein, the water tower applied to the water source heat pump central air conditioner further comprises a heat pump heater which is used for heating water in the water storage tank; the heat pump heater is arranged at the bottom of the tower body, and a cold water inlet and a hot water outlet of the heat pump heater are in connection with the water storage tank through two valves correspondingly.

7. The water tower applied to the water source heat pump central air conditioner according to claims 6, wherein, the gate valves are two-way valves that are installed in each of the multiple return water pipes; one of the two pipelines in each return water pipe stretches into the tower body from the top of the tower body through one two-way valve in the return water pipe and is in connection with the water distributing device, and the other pipeline is in connection with the water storage tank through the other two-way valve in the return water pipe.

8. The water tower applied to the water source heat pump central air conditioner according to claim 6, wherein, the gate valves are three-way valves, and one three-way valve is installed in each of the multiple return water pipes; each return water pipe is in connection with an inlet of the three-way valve; one of the two pipelines of the return water pipe is in connection with one outlet of the three-way valve, and the other pipeline of the return water pipe is in connection with the other outlet of the three-way valve.

9. The water tower applied to the water source heat pump central air conditioner according to claim 7, wherein, spraying openings communicating with the interior of the water distributing device are formed at the bottom of the water distributing device; the spraying openings are aligned to the cooling fillers.

10. The water tower applied to the water source heat pump central air conditioner according to claim 8, wherein, spraying openings communicating with the interior of the water distributing device are formed at the bottom of the water distributing device; the spraying openings are aligned to the cooling fillers.

11. The water tower applied to the water source heat pump central air conditioner according to claim 9, wherein, the water tower applied to the water source heat pump central air conditioner further comprises a plurality of electromagnetic valves which are used for controlling the water quantity; the multiple electromagnetic valves are in connection with the multiple supply pipes correspondingly.

12. The water tower applied to the water source heat pump central air conditioner according to claim 10, wherein, the water tower applied to the water source heat pump central air conditioner further comprises a plurality of electromagnetic valves which are used for controlling the water quantity; the multiple electromagnetic valves are in connection with the multiple supply pipes correspondingly.

\* \* \* \* \*